US011320986B2

(12) United States Patent
Ferreira et al.

(10) Patent No.: US 11,320,986 B2
(45) Date of Patent: May 3, 2022

(54) METHOD AND APPARATUS FOR ESTIMATING A DISTRIBUTION OF RESPONSE TIMES OF A STORAGE SYSTEM FOR A PROPOSED WORKLOAD

(71) Applicant: EMC IP HOLDING COMPANY LLC, Hopkinton, MA (US)

(72) Inventors: Paulo Abelha Ferreira, Rio de Janeiro (BR); Adriana Bechara Prado, Niterói (BR); Pablo Nascimento da Silva, Niterói (BR)

(73) Assignee: Dell Products, L.P., Hopkinton, MA (US)

( * ) Notice: Subject to any disclaimer, the term of this patent is extended or adjusted under 35 U.S.C. 154(b) by 30 days.

(21) Appl. No.: 16/747,096

(22) Filed: Jan. 20, 2020

(65) Prior Publication Data

US 2021/0223963 A1  Jul. 22, 2021

(51) Int. Cl.
*G06F 3/06* (2006.01)
*G06F 11/30* (2006.01)
*G06K 9/62* (2022.01)

(52) U.S. Cl.
CPC ............ *G06F 3/0611* (2013.01); *G06F 3/067* (2013.01); *G06F 3/0629* (2013.01); *G06F 3/0653* (2013.01); *G06F 3/0659* (2013.01); *G06F 11/3034* (2013.01); *G06K 9/6256* (2013.01)

(58) Field of Classification Search
CPC .... G06F 3/0611; G06F 3/0659; G06F 3/0653; G06F 3/067; G06F 3/0629; G06F 11/3034; G06F 11/3452; G06F 11/3447; G06F 11/3419; G06K 9/6256; G06K 9/00496; G06K 9/6226; G06N 20/00; G06N 7/005; G06N 3/08
USPC .................................................. 711/163, 154
See application file for complete search history.

(56) References Cited

U.S. PATENT DOCUMENTS

| 7,721,061 B1 * | 5/2010 | Kelly .................. G06F 11/3419 711/167 |
| 9,703,664 B1 * | 7/2017 | Alshawabkeh ......... G06F 3/067 |
| 10,484,301 B1 * | 11/2019 | Shukla ................ H04L 41/0896 |
| 2019/0334786 A1 * | 10/2019 | Dutta ................... G06F 11/3006 |

(Continued)

*Primary Examiner* — David Yi
*Assistant Examiner* — Zubair Ahmed
(74) *Attorney, Agent, or Firm* — Anderson Gorecki LLP

(57) ABSTRACT

A distribution of response times of a storage system can be estimated for a proposed workload using a trained learning process. Collections of information about operational characteristics of multiple storage systems are obtained, in which each collection includes parameters describing the configuration of the storage system that was used to create the collection, workload characteristics describing features of the workload that the storage system processed, and storage system response times. For each collection, workload characteristics are aggregated, and the storage system response information is used to train a probabilistic mixture model. The aggregated workload information, storage system characteristics, and probabilistic mixture model parameters of the collections form training examples that are used to train the learning process. Once trained, the learning process is used to provide a distribution of response times that would be expected from a storage system having a proposed configuration when processing a proposed workload.

16 Claims, 9 Drawing Sheets

(56) References Cited

U.S. PATENT DOCUMENTS

2019/0334801 A1* 10/2019 Dutta .................... G06K 9/6223
2019/0334802 A1* 10/2019 Dutta .................... G06F 11/3006
2020/0034197 A1* 1/2020 Nagpal .................. G06N 20/00

* cited by examiner

FIG. 6

| X (input) | | Y (output) |
|---|---|---|
| Storage System Configuration 224 | Aggregated Workload Features 222 | Probabilistic mixture model parameters 226 |
| Configuration 1 | IO | π | μ | σ |
| Configuration 2 | IO | π | μ | σ |
| ••• | ••• | ••• |
| Configuration n | IO | π | μ | σ |
| Configuration n+1 | IO | π | μ | σ |
| Configuration n+2 | IO | π | μ | σ |
| ••• | ••• | ••• |
| Configuration m | IO | π | μ | σ |

Training Examples 600: Configurations 1 through n

Testing Examples 610: Configurations n+1 through m

METHOD AND APPARATUS FOR ESTIMATING A DISTRIBUTION OF RESPONSE TIMES OF A STORAGE SYSTEM FOR A PROPOSED WORKLOAD

FIELD

This disclosure relates to computing systems and related devices and methods, and, more particularly, to a method and apparatus for estimating a distribution of response times of a storage system, with its particular system characteristics, for a proposed workload.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method of estimating a distribution of response times of a storage system for a proposed workload includes obtaining collections of information about operational characteristics of multiple storage systems. Each collection includes parameters describing the configuration of the storage system that was used to create the collection, workload characteristics describing features of the workload that the storage system processed, and storage system response times. For each collection, workload characteristics are aggregated, and the storage system response information is used to train a probabilistic mixture model. The aggregated workload information, storage system characteristics, and probabilistic mixture model parameters of the collections form training examples that are used to train the learning process. In some embodiments, once trained, the learning process is used to regress a probabilistic mixture model from an input proposed workload and proposed storage system configuration, to provide a distribution of response times that would be expected from a storage system having the proposed configuration when processing a workload having characteristics similar to the proposed workload.

BRIEF DESCRIPTION OF THE DRAWINGS

FIG. 6 is a functional block diagram of a set of training examples and testing examples configured to be used to train a learning process to learn a correlation between storage system characteristics, aggregated workload features, and probability models of storage system response times, according to some embodiments.

DETAILED DESCRIPTION

Aspects of the inventive concepts will be described as being implemented in connection with a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, computer instructions that are stored on a non-transitory tangible computer-readable medium and implemented by multi-purpose tangible processors, and any combinations thereof.

Figure 1:
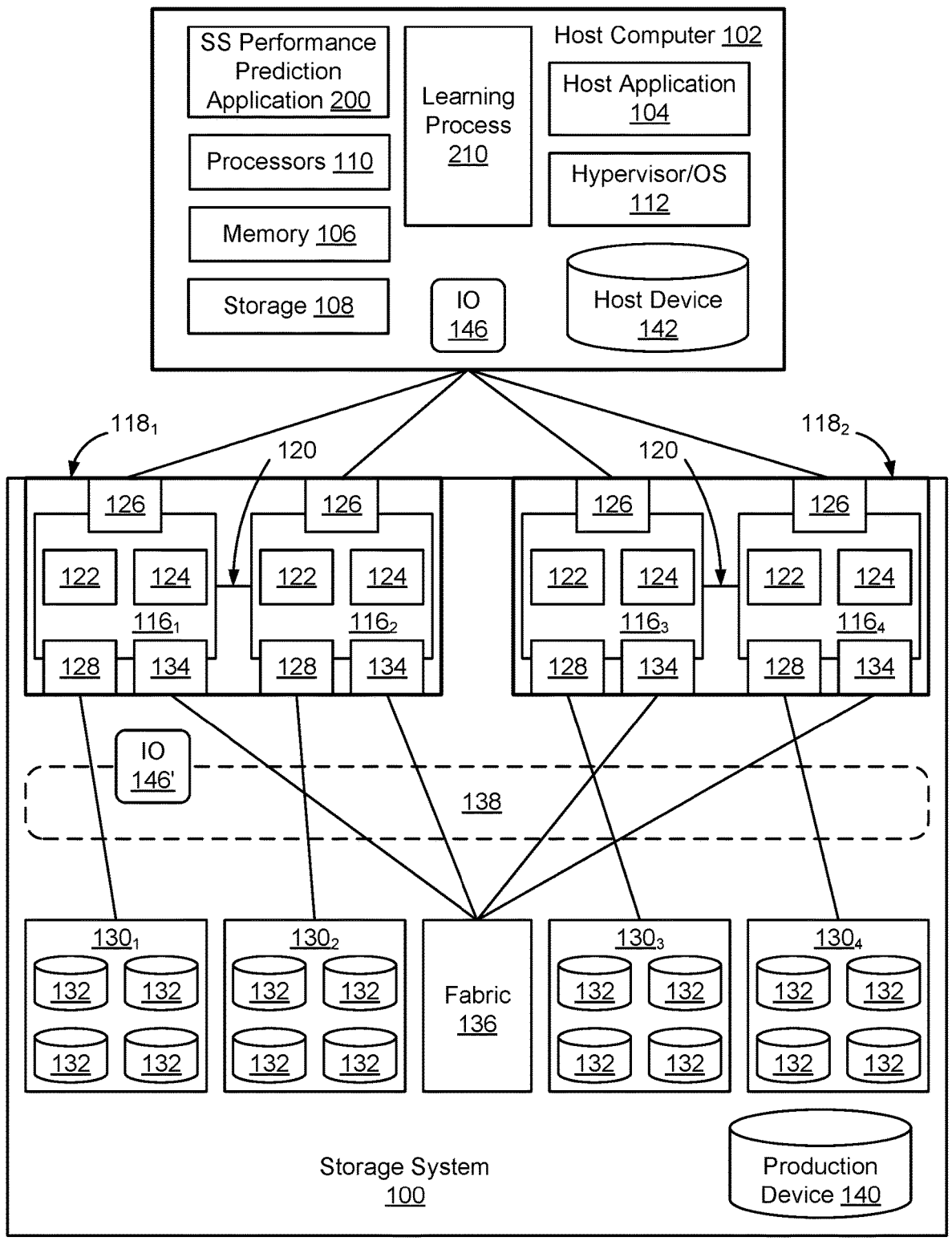
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example the host computer 102 is a server with volatile memory 106, persistent storage 108, one or more tangible processors 110, and a hypervisor or OS (operating system) 112. The processors 110 may include one or more multi-core processors that include multiple CPUs, GPUs, and combinations thereof. The volatile memory 106 may include RAM (Random Access Memory) of any type. The persistent storage 108 may include tangible persistent storage components of one or more technology types, for example and without limitation Solid State Drives (SSDs) and Hard Disk Drives (HDDs) of any type, including but not limited to SCM (Storage Class Memory), EFDs (enterprise flash drives), SATA (Serial Advanced Technology Attachment) drives, and FC (Fibre Channel) drives. The host computer 102 might support multiple virtual hosts running on virtual machines or containers, and although an external host computer 102 is illustrated, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine is implemented using a single physical enclosure and provides a logical separation between itself and other storage engines 118 of the storage system 100. A given storage system 100 may include one or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using Non-Volatile Memory (NVM) media technologies, such as NAND-based flash, or higher-performing Storage Class Memory (SCM) media technologies such as 3D XPoint and Resistive RAM (ReRAM). Managed drives 132 may be directly connected to the compute nodes $116_1$-$116_4$ using a PCIe bus, or may be connected to the compute nodes $116_1$-$116_4$, for example, by an InfiniBand (IB) bus or fabric.

In some embodiments, each compute node 116 also includes one or more CAs (channel adapters) 134 for communicating with other compute nodes 116 directly or via an interconnecting fabric 136. An example interconnecting fabric may be implemented using InfiniBand.

Each compute node 116 may allocate a portion or partition of its respective local volatile memory 124 to a virtual shared "global" memory 138 that can be accessed by other compute nodes 116, e.g. via Direct Memory Access (DMA) or Remote Direct Memory Access (RDMA).

The storage system 100 maintains data for the host applications 104 running on the host computer 102. For example, host application 104 may write host application data to the storage system 100 and read host application data from the storage system 100 in order to perform various functions. Examples of host applications 104 may include but are not limited to file servers, email servers, block servers, and databases.

Logical storage devices are created and presented to the host application 104 for storage of the host application data. For example, a production device 140 and a corresponding host device 142 are created to enable the storage system 100 to provide storage services to the host application 104. The host device 142 is a local (to host computer 102) representation of the production device 140. Multiple host devices 142 associated with different host computers 102 may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (logical block addresses) on which data used by the host application 104 resides and can be stored. However, the data used by the host application 104 and the storage resources available for use by the host application 104 may actually be maintained by the compute nodes $116_1$-$116_4$ at non-contiguous addresses on various different managed drives 132 on storage system 100.

In some embodiments, the storage system 100 maintains metadata that indicates, among various things, mappings between the production device 140 and the locations of extents of host application data in the shared global memory 138 and the managed drives 132. In response to an IO (input/output command) 146 from the host application 104 to the host device 142, the hypervisor/OS 112 determines whether the IO 146 can be serviced by accessing the host computer memory 106. If that is not possible then the IO 146 is sent to one of the compute nodes 116 to be serviced by the storage system 100.

There may be multiple paths between the host computer 102 and the storage system 100, e.g. one path per front-end adapter 126. The paths may be selected based on a wide variety of techniques and algorithms including, for context and without limitation, performance and load balancing. In the case where IO 146 is a read command, the storage system 100 uses metadata to locate the commanded data, e.g. in the shared global memory 138 or on managed drives 132. If the commanded data is not in the shared global memory 138, then the data is temporarily copied into the shared global memory from the managed drives 132 and sent to the host application 104 via one of the compute nodes $116_1$-$116_4$. In the case where the IO 146 is a write command, in some embodiments the storage system 100 copies a block being written into the shared global memory 138, marks the data as dirty, and creates new metadata that maps the address of the data on the production device 140 to a location to which the block is written on the managed drives 132. The shared global memory 138 may enable the production device 140 to be reachable via all of the compute nodes 116₁-116₄ and paths, although the storage system 100 can be configured to limit use of certain paths to certain production devices 140. Likewise, learning process 210 can be incorporated into storage system performance prediction application 200 depending on the implementation.

As discussed in greater detail herein, in some embodiments one of the host applications 104 is a storage system performance prediction application 200 associated with a learning process 210. Although FIG. 1 shows both the storage system performance prediction application 200 and learning process 210 implemented on the same host 104, in other embodiments the two processes may be implemented on separate hosts 104.

In some embodiments, the storage system performance prediction application 200 receives collections of information about operational characteristics of multiple storage systems 100 and uses the collections of information to train the learning process 210. In some embodiments, each collection includes parameters describing the configuration of the storage system that was used to create the collection, workload characteristics describing features of the workload that the storage system processed, and storage system response times.

Once the learning process 210 is trained, the storage system performance prediction application 200 uses the trained learning process 210 to generate a distribution of response times that would be expected for a storage system having a particular configuration, when presented with a proposed workload. Additional details about how the collections are preprocessed to be used to train the learning process 210, and how the trained learning process 210 is used by the storage system performance prediction application 200, is discussed below in connection with FIGS. 2-9.

There are many ways to configure a storage system 100 such as the storage system of FIG. 1. For example, in some embodiments, the number of storage engines 118 is configurable such that a given storage system 100 may be configured to have anywhere between 2 and 8 storage engines 118. Likewise, in some embodiments the number of back-end drive arrays 130 is configurable, such that the storage system 100 may be configured to have anywhere between 2 and 16 back-end drive arrays 130. When a customer is looking to acquire a storage system to handle a particular proposed workload, the customer will want to know what storage system configuration is appropriate and will be capable of both handling the workload and achieving adequate response times. Accordingly, sizing the storage system 100 is an important aspect to determining what infrastructure is required to support a particular customers' needs. However, sizing a storage system is often done without knowing exactly if the sized infrastructure will satisfy the response-time requirements of the host applications 104.

There are many features of a storage system 100 that may be configured. Several example features include the number of storage engines 118, the number of back-end drive arrays 130, the number and capacity of the managed drives 132, the size of local volatile memory 124, information about how the storage system 100 is executing, such as the number of mirroring processes being used to protect data stored on the managed drives 132, and other parameters. Further, information about the individual components may affect operation of the storage system. For example, the number of cores 122 in the compute nodes 116, the type of operating system in use on the compute nodes 116, the number of cores in the adapters (e.g. front-end adapter 126, back-end adapter 128, or channel adapter 134), the number of ports in the various system components, and numerous other parameters.

Likewise, there are many ways to characterize a workload. For example, the workload may be summarized by looking at the total number of IO operations, the total number of read operations, the percentage of reads to writes, the total number of reads that were able to be served from cache, the size of the reads that were able to be served from the cache, the total number of reads that were not able to be served from the cache (cache misses), and the sequentiality of the read requests. Similar parameters may be used to characterize the write operations. Accordingly, there are many aspects of workload telemetry data that may be used to characterize the workload. Although an example will be provided (below) in which the features of interest are the number of read operations and the number of write operations, numerous other workload features may be used as well, or instead, to characterize the workload on a storage system.

According to some embodiments, as discussed in greater detail below, the storage system performance prediction application 200 is configured to provide an estimate of a distribution of response times that a storage system 100, with a particular configuration, would be expected to provide when presented with a proposed workload. Knowing a distribution of expected response times enables the behavior of the storage system to be more accurately and thoroughly evaluated, to determine whether the storage system configuration will adequately perform when presented with the proposed workload.

In some embodiments, the learning process 210 is configured as a deep neural network using a supervised regression, which is used to regress (infer) a numeric target value from one or more input values. As discussed in greater detail herein, in some embodiments the input values are storage system 100 configurations and workload characteristics, while the target value is a set of parameters θ, coming from a probability mixture model of response times. This parameter θ can be seen in FIG. 5 as determining the probability mixture model.

In some embodiments, available telemetry data from different storage system 100 configurations is used to train the learning process 210 (machine learning) to enable the learning process 210 to model the relationship between storage system 210 configuration parameters (e.g., storage system model, number of flash or spin disks, number of storage engines 118, etc.)., characteristics of the workloads running on those systems (e.g., number of cache read/write hits/misses, size of reads/writes in MB, etc.), and the measured response times of the storage system 100. Once trained, the learning process 210 can be used to provide an estimate of distributions of response times that would be expected if a storage system 210 having a particular system configuration is presented with a proposed workload. For example, the trained learning process 210 can be used to provide an estimated distribution of read and write response times of a particular storage system 100 configuration when presented with a particular workload. As a result, customers can have an immediate estimate of a distribution of response times of the system they are evaluating, without requiring a performance evaluation (operational testing) of the proposed storage system.

The problem of predicting response times by exploiting telemetry data coming from different storage systems poses several challenges. First, the telemetry data must have high quality. The quality of a data used in any machine learning task has a big effect on its chances for success. Normally, there is a huge amount of information coming from telemetry data. Selecting the set of records and/or attributes (referred to herein as features), that best represent the problem in question is not a trivial task. A filtering process is often needed, so that records and/or attributes that are not informative/relevant enough are discarded from the raw data. Second, the predictions must be accurate. Since users are very sensitive to their requirements in terms of response times, there is a need to build an accurate model that can output its predictions within an acceptable error margin and confidence. Third, the predictions must be informative. For example, as discussed herein, according to some embodiments the storage system performance prediction application 200 is configured to provide an estimate of distributions of possible response times that this particular workload type may meet, when running on the system in question. The estimation method needs to relate different workload characteristics and system configurations to different possible distributions of response times. Fourth, the prediction must be fast. For example, for a given set of proposed workflow characteristics and response time requirements, the storage system performance prediction application 200 should be able to iteratively search through different options of system configurations in an acceptable time to look for a system configuration that is able to meet the target response times.

To perform this machine learning task, a dataset containing various examples of input values matched to all their corresponding target values is required. The task is then to learn a mapping that accurately leads from the input to the target—this learning is done during a training stage using a training set. The learning process 210 is trained until it reaches a predefined accuracy level, based on the learning process's response to a test set. In some embodiments the test set is a series of examples that the learning process 210 did not see during the training stage. In some embodiments, the learning phase includes some form of probability divergence signal to ensure that the learning process 210 is approximating the true response time distribution for that system configuration and workload.

In some embodiments, the availability of telemetry data and storage system response times is leveraged to enable a learning process 210 to be trained to estimate a distribution of expected response times for a given system configuration and proposed workload. To train the learning process 210, many collections of telemetry data are obtained from many different storage systems 100 and from many different workloads. Each data collection includes a set of workload characteristics, also referred to herein as workload features, and the corresponding response times of the storage system that are gathered during operation of the storage system. The configuration of the storage system 100 on which the telemetry data was obtained is also collected.

To create a collection of telemetry data, workload features on the associated storage system 100 and the response time of the storage system 100 are collected over a set of time periods. For example, workload features of interest, such as the number of read operations and the number of write operations, may be counted and recorded in a set of successive five-minute intervals. The average response time of the storage system is also determined for each time interval. Thus, if a collection of telemetry data is created by monitoring a storage system's response to a workload over a 10-hour period of time, the collection of telemetry data would include 120 samples of data. Each data sample in a collection is referred to herein as a workload snapshot 221. Thus, a "collection" includes a set of "workload snapshots", that were created from by observing features of interest in a workload and the storage system response time as the workload is processed by a given storage system. Each collection is associated with storage system configuration parameters describing the configuration of the storage system that was used to create the collection. Although FIGS. 3 and 4, set forth below, separately describe the manner in which the workload features and storage system response times are processed to produce training examples to be used to train a learning process 210, it should be understood that a given "collection" includes both the workload features and the storage system response time information.

Figure 2:
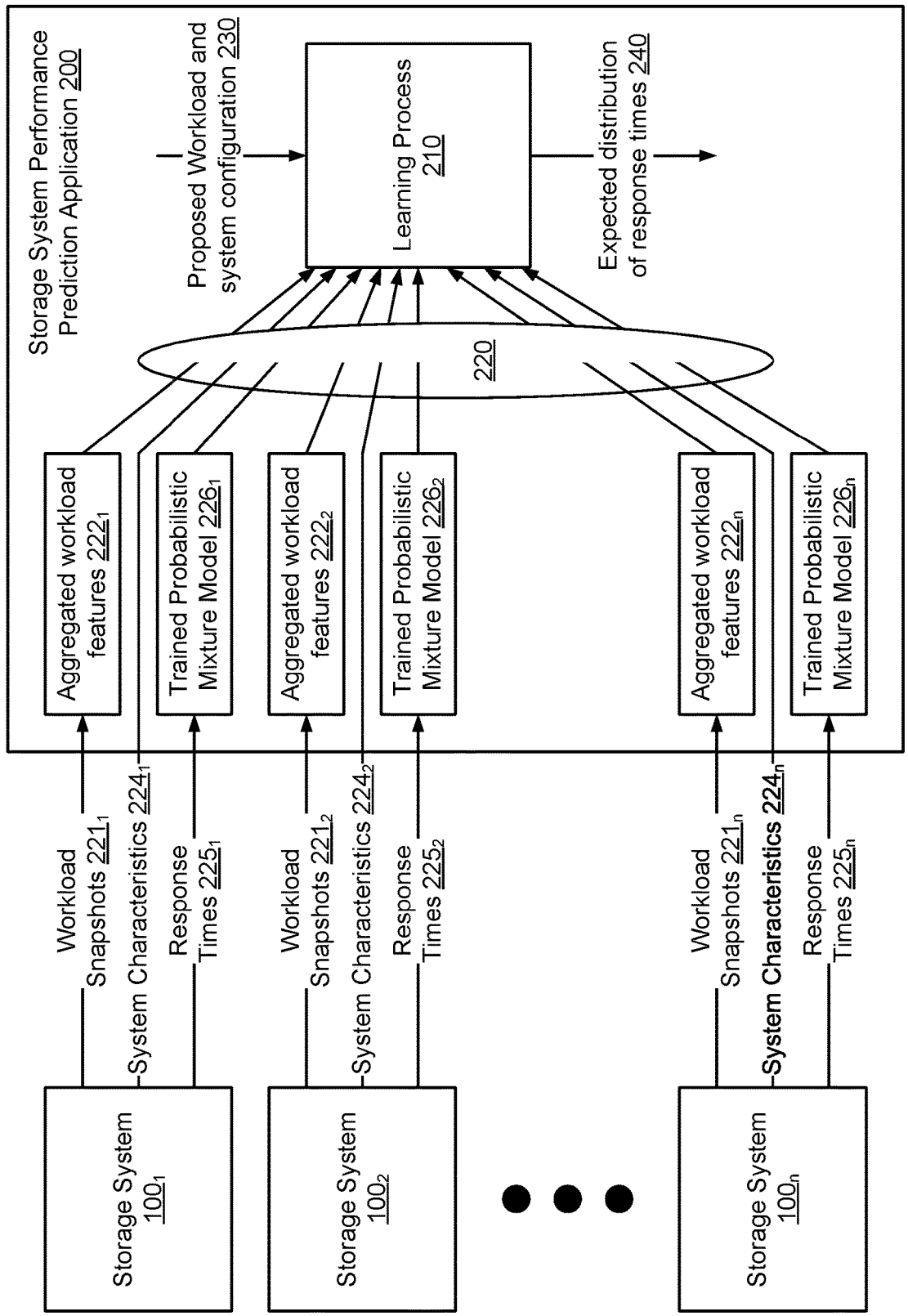
FIG. 2 is a functional block diagram of a system for providing training information to a learning process to train the learning process, and using the trained learning process to provide an expected distribution of response times for a proposed workload and system configuration, according to some embodiments.

FIG. 2 is a functional block diagram of a system for providing training examples to a learning process 210, and using the trained learning process 210 to provide an expected distribution of response times 240 for a proposed workload and system configuration 230, according to some embodiments. As described in greater detail below, in some embodiments the training examples and testing examples that are used to train and test the learning process 210 are obtained from collections of workload and storage system response data from multiple storage systems 100. Although FIG. 2, shows the learning process 210 implemented as part of the storage system performance prediction application 200 includes a learning process 210, in other embodiments the learning process 210 and storage system performance prediction application 200 are separate processes.

Training examples 220, in the form of aggregated workload features 222, system characteristics 224, and probabilistic mixture model parameters 226 computed from the storage system 100 response times, are provided to the learning process 210 during a training phase. The training examples 220 are obtained from collections of training data from multiple storage systems 100, and are used during the training phase to cause the learning process to learn a correlation between storage system configuration, workload features, and probabilistic storage system response times. Once trained, the trained learning process 210 can be used to generate an expected distribution of response times 240 when provided with a proposed workload and storage system configuration 230.

Figure 3:
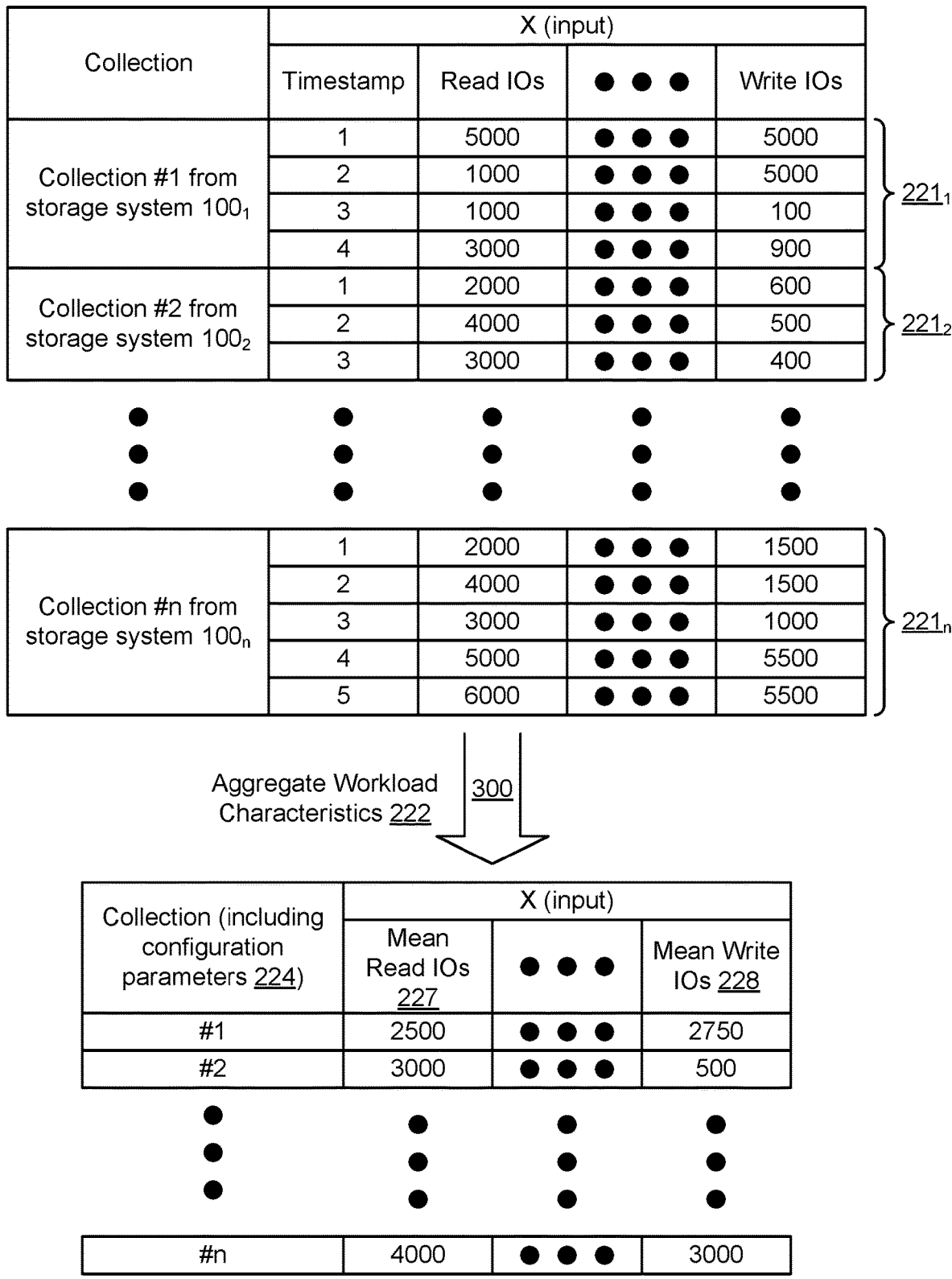
FIG. 3 is a functional block diagram of a set of data structures configured to aggregate workload characteristics from storage systems to create training data for the learning process of FIG. 2, according to some embodiments.

FIG. 3 shows a data structure containing a set of collections of workload snapshots 221 taken from multiple storage systems $100_1$-$100_n$. As shown in FIG. 3, in some embodiments, collections of workload snapshots 221 are created from storage system workload telemetry traces as the storage systems are processing data access operations. For example, as shown in FIG. 3, the number of read IOs number of write IOs and numerous other features of telemetry data associated with workload on the storage system may be monitored and determined periodically. Thus, as shown in FIG. 3, storage system #1, processed 5000 read IOs and 5000 write IOs during the time period (workload snapshot 221) associated with timestamp #1. During the next workload snapshot 221 associated with timestamp #2, the storage system 100 processed 1000 read IOs and 5000 write IOs. Other features may be used to characterize the telemetry data as well, and read IOs and write IOs are used in this example simply to provide one explanation of how the telemetry data is pre-processed to be provided to the learning process 210.

Collections of workload snapshots 221 are collected from multiple storage systems $100_1$-$100_n$. The collections of workload snapshots 221 do not all need to have the same number of workload snapshots 221. For example, in FIG. 3 the collection associated with storage system $100_1$ has four workload snapshots $221_1$, the collection associated with storage system $100_2$ has three workload snapshots $221_2$, and the collection associated with storage system $100_n$ has 5 workload snapshots 2213. Thus, different numbers of workload snapshots 221 may be obtained from different storage systems 100 to form collections of workload snapshots 221. However, within a given collection, preferably the workload snapshots 221 are taken using fixed size windows. Thus, for example the collection of workload snapshots 221, associated with storage system $100_1$, preferably has workload snapshots $221_1$ all of the same size, e.g. all workload snapshots $221_1$ are associated with 5 minutes of telemetry data. Different collections, however, might have different sized workload snapshot intervals. For example, the collection of workload snapshots $221_1$ associated with storage system $100_1$ might have workload snapshots $221_1$ taken in 5-minute intervals, whereas the workload snapshots $221_2$ associated with storage system $100_2$ might have workload snapshots $221_2$ taken in 4-minute intervals.

As shown in FIG. 3 by Arrow 300, in some embodiments the set of collections of telemetry data are individually aggregated to crate training examples that are configured to be used to train/test the learning process 210. Multiple ways of aggregating the snapshots 221 may be implemented. For example, as shown in FIG. 2, in some embodiments the aggregation process is implemented by calculating a mean of the parameters reported in the workload snapshots 221 for each collection. Other parameters, such as the standard deviation from the mean may also be calculated from the set of snapshots depending on the implementation.

In the example shown in FIG. 3, each workload snapshot 221 in each collection has information about the number of read IOs and number of write IOs that occurred during the period of time associated with the workload snapshot 221. During the aggregating process, the mean number of read IOs 227 is created for each collection and the mean number of write IOs 228 is created for each collection. The aggregated workload feature information 222 is stored in a data structure correlating the aggregated workload features 222 with system configuration information 224 about the storage system 100 that processed the workload. It is assumed that the storage system configuration does not change over the time period in which the collection was obtained. Accordingly, as shown in FIG. 3, in some embodiments, preprocessing telemetry data includes creating aggregated workload features 222 which are correlated with storage system configuration parameters 224.

Figure 4:
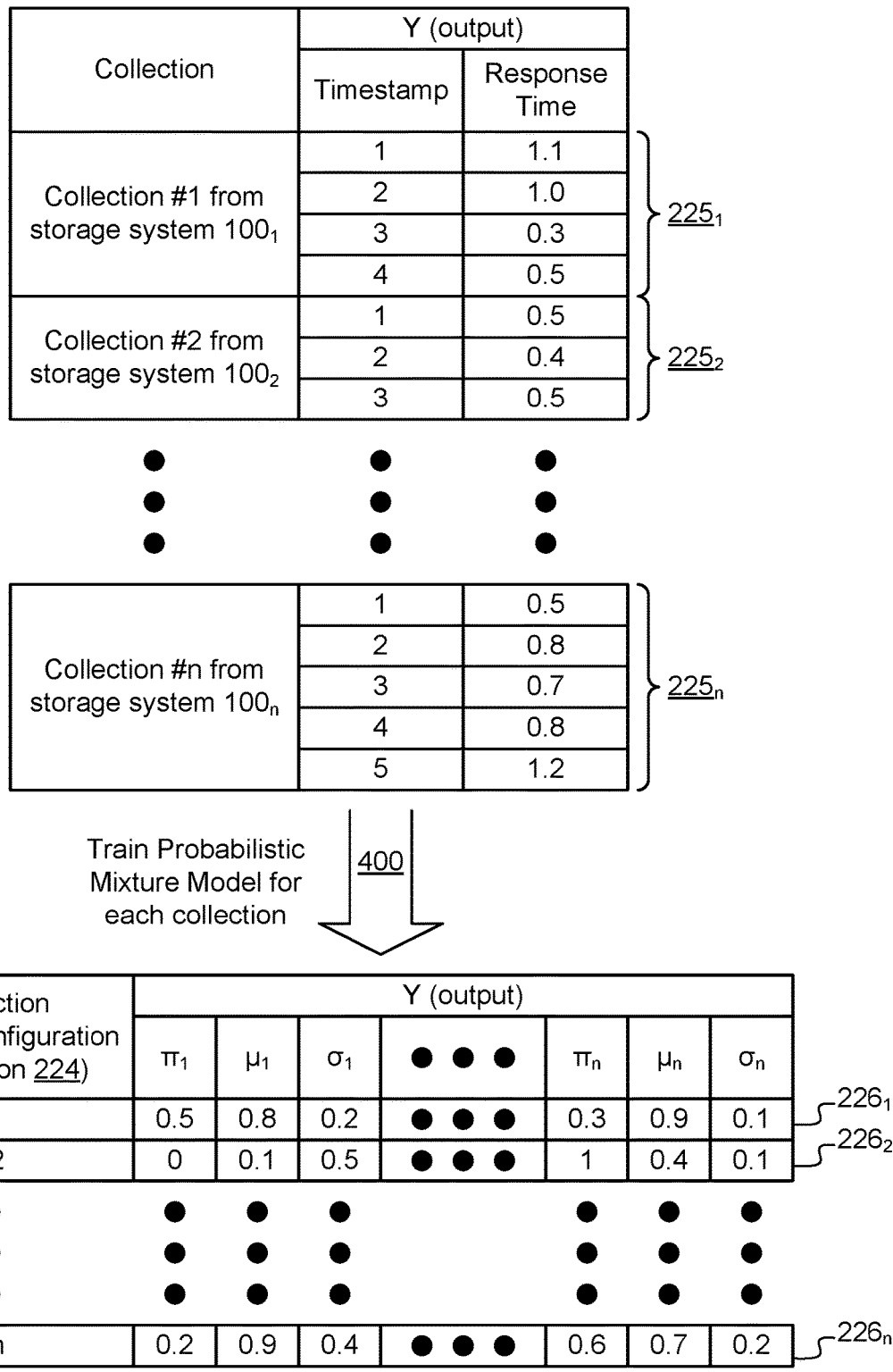
FIG. 4 is a functional block diagram of a set of data structures configured to train probabilistic models of response times of storage systems to create training data for the learning process of FIG. 2, according to some embodiments.

In addition to containing information related to workload features, each collection also includes information about the storage system response time during each snapshot. The term "response time" refers to the amount of time it took, on average, for the storage system to process the workload during the period of time associated with the snapshot. This is shown in FIG. 4. For example, on the top portion of FIG. 4, during the period of time (workload snapshot 221) associated with timestamp #1, storage system $100_1$ had an average response time of 1.1 (units have not been included because they could be any measurement depending on the implementation). During the period of time (workload snapshot 221) associated with timestamp #2, the storage system $100_1$ had an average response time of 1.0.

As shown by arrow 400 in FIG. 4, in some embodiments, the response times of the storage system 100, of each collection of workload snapshots 221, are used to train a probabilistic mixture model for each collection.

A probabilistic mixture model is a probabilistic model that assumes all data points are generated from a mixture of a finite number of distributions. For example, a Gaussian mixture model assumes that data points are generated from a mixture of a finite number of Gaussian distributions, each distribution having particular parameters such as mean and standard deviation. In some embodiments, the probability mixture model is described by $P_\theta(x)=\Sigma_{i=1}^n \pi_i N(\mu_i, \sigma_i^2)$, in which $\pi_i$, $\mu_i$, and $\sigma_i$, are coefficients that are learned from response times of the storage system for each of the finite number of distributions, and n is the modality (number of distributions) of the probability mixture model. For example, if the number of distributions is assumed to be three, the coefficients $(\pi_1\ \mu_1\ \sigma_1)$, $(\pi_2\ \mu_2\ \sigma_2)$, and $(\pi_3\ \mu_3\ \sigma_3)$, would be learned from the response times that the storage system exhibited while processing the workload.

In some embodiments, an EM (Expectation-Maximization) algorithm is used to learn a Gaussian mixture model. The EM algorithm model is only one out of many possible embodiments of a possibility mixture model learning algorithm, and other learning processes may be used to learn the probability mixture models depending on the embodiment. Similarly, a Gaussian mixture model is only one out of many possible embodiments of a probability mixture model, and other mixture models may be used depending on the embodiment. The Expectation-Maximization algorithm is an iterative process that uses, as input, the response times of the storage system, and converges toward a solution describing the probability mixture model. To enable the EM algorithm to learn a Gaussian mixture model, the modality (number of distributions) is fixed in advance. Specifically, the maximum number of possible distributions that are presumed to generate the response data is fixed in advance, and then the EM algorithm is used to learn the parameters describing the set of Gaussian distributions. In some embodiments, a mixture model is learned for each storage system based on the response times of the storage system when presented with workload having particular characteristics.

As shown on the bottom portion of FIG. 4, each collection of workload snapshots 221 is used to train a probabilistic mixture model to derive the coefficients π, µ, and σ for each distribution. In an embodiment in which an Expectation-Maximization algorithm is used to learn the parameters of a Gaussian mixture model, the response times of the storage system at each snapshot are iteratively input to enable the Expectation-Maximization algorithm to converge to the probabilistic mixture model describing the response times of the particular storage system. In the example shown in FIG. 4, the modality is set to "n" and, as such, the probabilistic mixture model is trained to find n sets of coefficients π, µ, and σ that best describe the response time of the storage system 100 associated with the collection.

It should be noted, as shown in FIG. 4, that the probabilistic mixture models that are derived from the collections are based wholly on the storage system response time—the workload characteristics and the storage system characteristics themselves are not used during the process of deriving the probabilistic mixture models.

Figure 5:
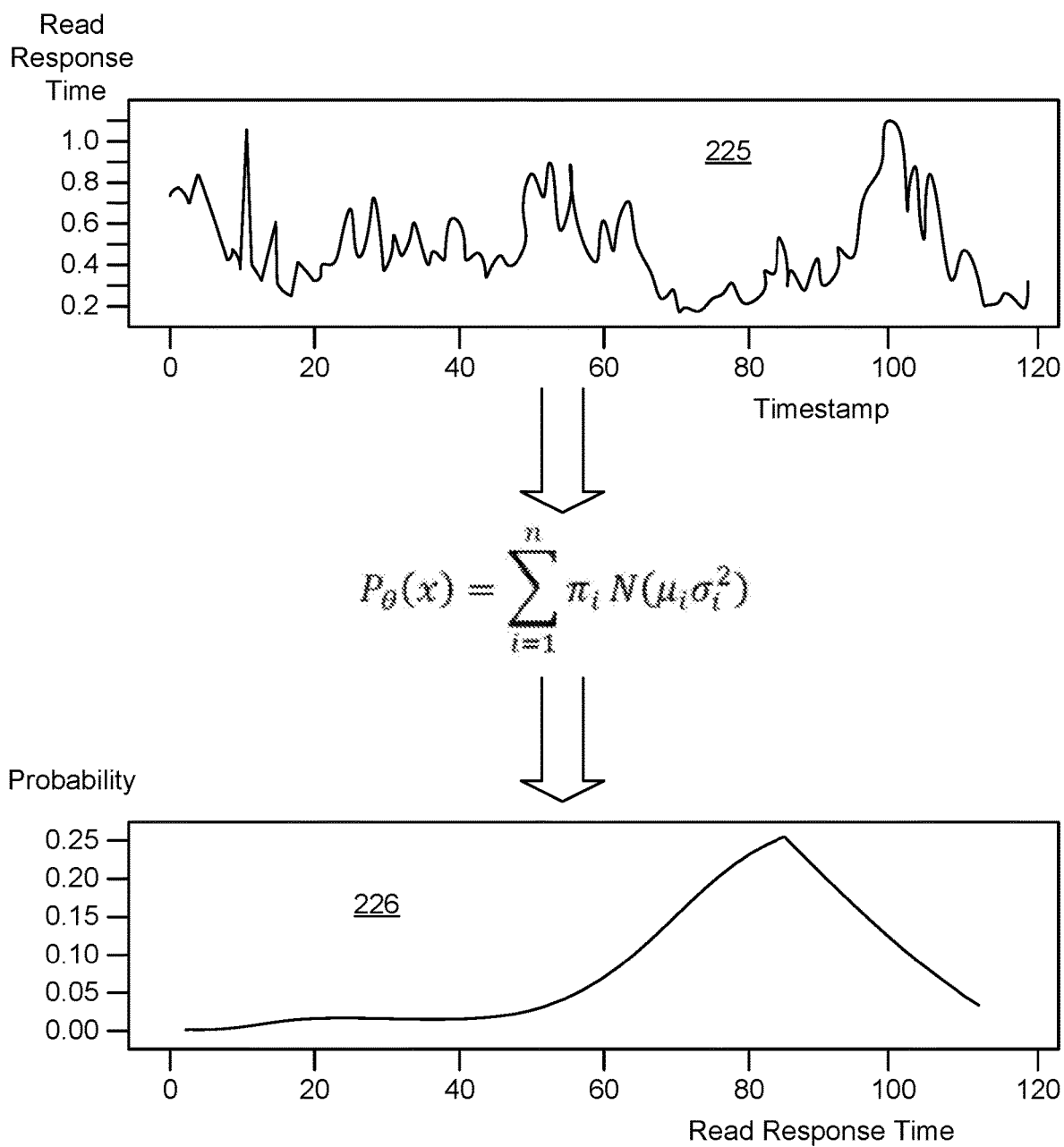
FIG. 5 is a pair of graphs showing a relationship between a storage system's response times and a probabilistic model of the storage system's response times, according to some embodiments.

FIG. 5 graphically shows a transformation from storage system response time to a trained probabilistic mixture model. For example, the top graph shows how a hypothetical storage system read response time might change over time. The bottom graph shows the probability of the storage system exhibiting a range of read response times. A probability mixture model is a model of n probability functions, such as n Gaussian distributions, that when summed most closely match the system response time probability distribution shown on the lower graph.

The aggregated workload feature data 222 of each collection shown in FIG. 3 is correlated with the associated trained probabilistic mixture model of FIG. 4 to form training data examples to be used to train the learning process 210. For example, aggregate workload characteristics of collection #1 (see FIG. 3 reference 3001) is correlated with the trained probabilistic mixture model #1 (see FIG. 4 reference 4001) to form a first training example that is provided to the learning process 210 during the training phase. Multiple training examples are built and sequentially used to train the learning process 210. Likewise, collections may be used to build testing examples that can be used to test the response of the learning process 210 to determine if the learning process 210 is sufficiently trained or if additional training is required. Although separate data structures are shown in FIGS. 3 and 4 to illustrate how aspects of the data can be processed to form training examples, it should be understood that a common data structure may be used to store the data shown in both FIGS. 3 and 4.

FIG. 6 is a functional block diagram of a set of training examples 600 and testing examples 610. As shown in FIG. 6, each training example 600 is formed from a collection of information. Each training example 600 includes information about the storage system configuration 224, aggregated workload features 222 describing the workflow during the period of time that the collection was created, and probabilistic mixture model parameters 226 describing a learned mixture model based on the response times of the storage system during the period of time that the collection was created.

In some embodiments, training examples 600 are input to the learning process 210 to cause the learning process to learn a correlation between independent variables X and a dependent variable Y. In some embodiments, as shown in FIG. 6, the independent variables X are the aggregated workload features 222 and the storage system characteristics 224, and the dependent variable Y is the response time probabilistic mixture model parameters 226.

The testing examples 610 are identical to the training examples, but are made from collections that are not used to create the training examples. In some embodiments, the learning process 210 is tested by providing the storage system configuration and aggregated workload features into the learning process 210, and comparing the output of the learning process 210 (distribution of response times) with the probabilistic mixture model describing the distribution of response times actually exhibited by the storage system. By testing the learning process 210 using examples not seen by the learning process during the training phase, it is possible to compare the estimated distribution of response times output by the learning process with the actual distribution of response times of the storage system associated with the testing example.

Figure 7:
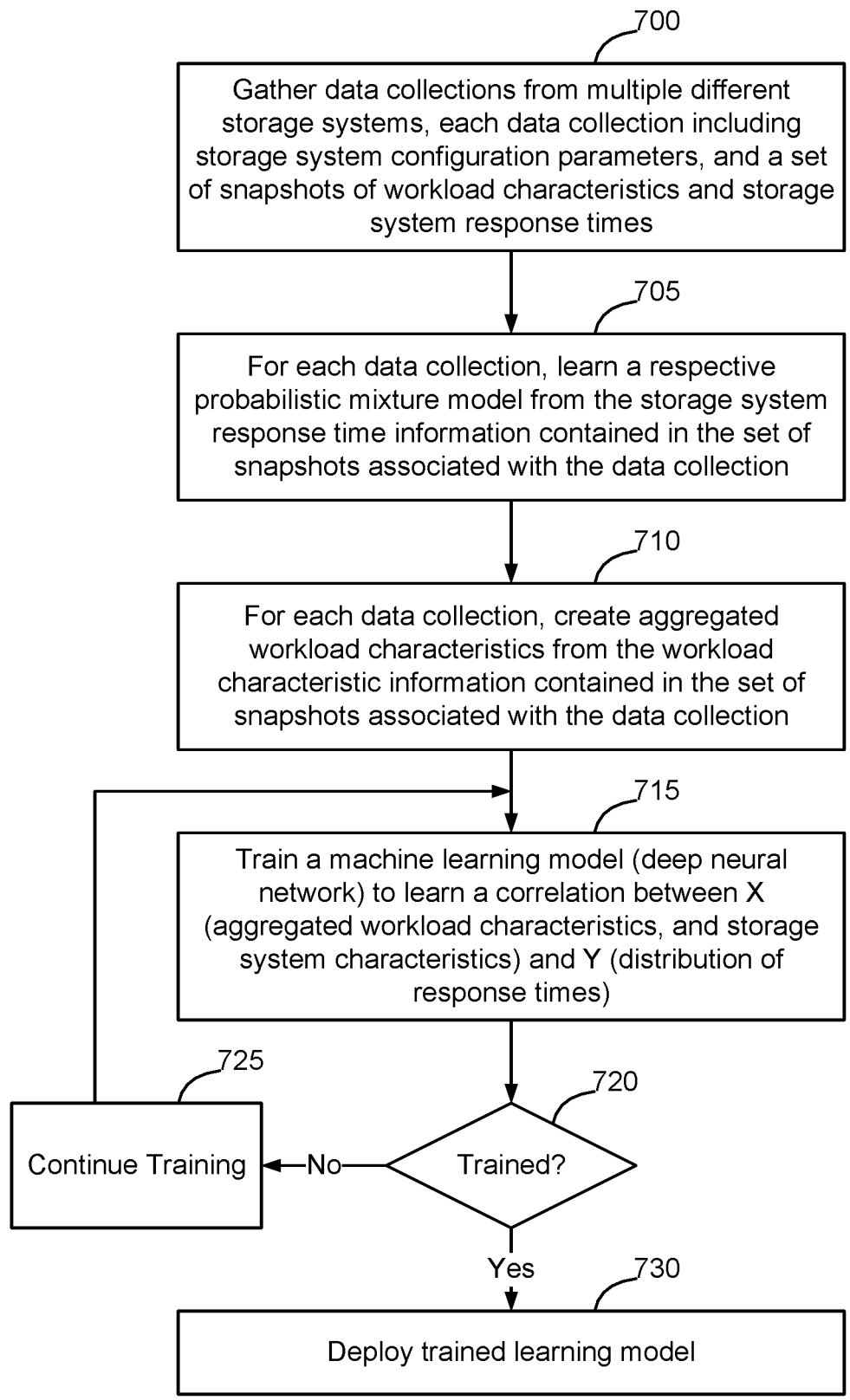
FIG. 7 is a flow chart of a method of training a learning process to generate an estimate of a distribution of response times of a storage system for a proposed workload, according to some embodiments.

FIG. 7 is a flowchart of a method of training a learning process 210 to output an estimate of a distribution of response times of a storage system 100 for a proposed workload, according to some embodiments. As shown in FIG. 7, at block 700 the method gathers data collections from multiple different storage systems 100. Multiple collections may likewise be collected from a given storage system, for example in connection with how the storage system handled workloads with different characteristics. Each data collection includes storage system configuration parameters and a set of workload snapshots 221 of workload characteristics and storage system response times.

At block 705, for each data collection, a respective probabilistic mixture model is learned from the storage system response time information contained in the set of workload snapshots 221 associated with the data collection. At block 710, for each data collection, aggregated workload features 222 are created from the workload characteristic information contained in the set of workload snapshots 221 associated with the data collection. Blocks 705 and 710 may be implemented in either order or at the same time.

The data structures created in blocks 705 and 710 are correlated with each other to create training examples that are iteratively input into a learning process 210 to train the learning process 210 (block 715). In some embodiments, the learning process 210 is a deep neural network configured to implement a regression model. In some embodiments, the learning process 210 is trained to learn a correlation between the independent variables X (aggregate workload characteristics, and storage system characteristics) and a dependent variable Y (distribution of response times).

At block 720, the learning process 210 is tested and a determination is made as to whether the learning process 210 is trained. In some embodiments, a portion of the training data is used to test the learning process 210 to determine if the learning process 210 is sufficiently accurate. For example, in some embodiments a portion of the training examples created from collections are not used to train the learning process, but instead are used to test the learning process 210 to determine whether the learning process is sufficiently accurate. If the learning process 210 is not sufficiently trained (a determination of NO at block 720) the training process continues using additional training examples (block 725). If the learning process 210 is sufficiently trained (a determination of YES at block 720), the learning process 210 is deployed (block 730) and is available to be used in a predictive manner. Optionally the learning process 210 may continue to be trained after being deployed as additional training examples are obtained.

In some embodiments, the learning process 210 implements a machine learning algorithm capable of learning non-linear relationships. One example of such an algorithm could be a deep neural network with non-linear activations. In some embodiments, training the learning process 210 includes using a probability divergence loss that penalizes according to, for example, a closed-formula (or approximation thereof) divergence based on the parameters of the mixture model. Other embodiments may use other types of learning processes as would be understood by a person of ordinary skill in the art.

Figure 8:
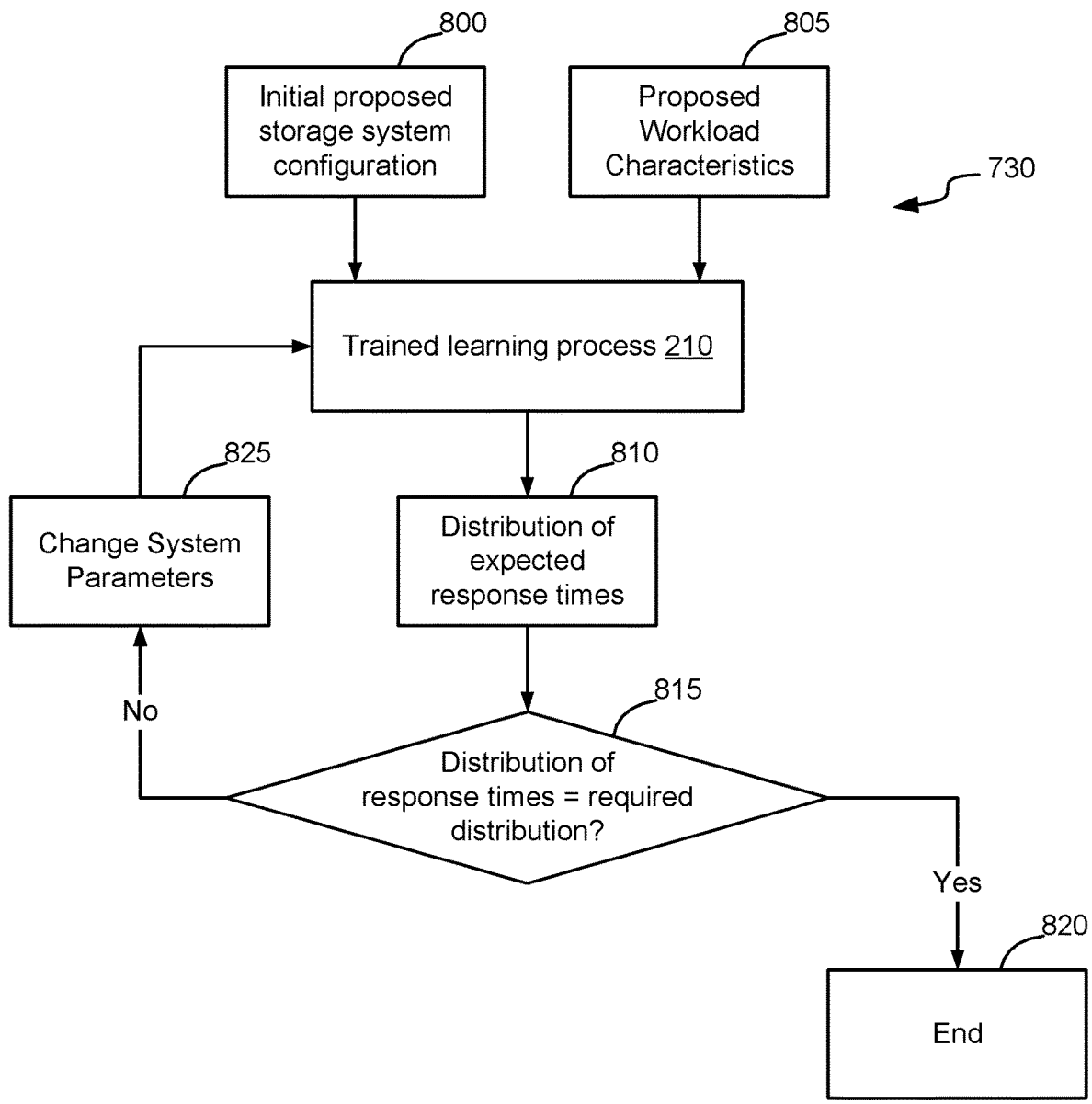
FIG. 8 is a flow chart of a method of using the trained learning process to output an estimate of a distribution of response times of a storage system for a proposed workload and storage system configuration, according to some embodiments.

FIG. 8 is a flow chart of an example method of using the trained learning process 210 to provide, as an output, an estimate of a distribution of response times of a storage system for a proposed workload. For example, if a customer wants to purchase a storage system, the customer might want to determine, prior to purchasing the system, a distribution of response times the customer would expect to see from the storage system given the proposed workflow characteristics. Accordingly, as shown in FIG. 8, in some embodiments the proposed storage system configuration (block 800) and proposed workload characteristics (block 805) are provided as input to a trained learning process 210. Proposed workload characteristics may be based on the type of application 104 that is planned to be used to generate the workload, and many other factors.

The trained learning process 210 outputs (block 810) a distribution of expected response times that a storage system configured as specified in block 800 would be expected to provide when processing a workload having features similar to the proposed workload. Predicting response times analytically has conventionally been extremely hard, due to the complexity of storage systems 100 and the number of factors that can affect how quickly a given storage system will be able to process a given workload. Using the trained learning process 210, as described herein, makes this process possible and is able to accurately predict a distribution of response times rather than a single maximum expected response time for a particular workload. This type of information is more useful when making a purchasing decision because the range of expected response times is able to be determined prior to purchasing the storage system without requiring the proposed system to be configured and tested to verify the manner in which the storage system will handle a given workflow.

In some embodiments, the method of FIG. 8 is iterated to enable the initial proposed system configuration to be adjusted until a set of system parameters is selected in block 825 that is determined in block 815 to provide a required distribution of expected response times for the proposed workload. Specifically, as shown in FIG. 8, an initial storage system configuration and proposed workload characteristics is provided to the trained learning process at block 800, and the trained learning process generates as output an initial distribution of expected storage system response times (block 810). At block 815, the initial distribution of expected response times generated by the trained learning process 210 is compared with a required distribution of response times. If the distribution of expected response times output by the learning process 210 meets the required distribution of response times (a determination of YES at block 815) the initial system configuration is satisfactory and the process ends (block 820). If the distribution of expected response times output by the learning process 210 does not meet the required distribution of response times (a determination of NO at block 815), alternate system configuration parameters are selected at block 825, and the new storage system configuration and proposed workload characteristics (from block 805) are provided to the trained learning process 210. By iterating blocks 810, 815, and 825, it is possible to cycle through various storage system configurations to automatically determine a storage system configuration that will meet a required distribution of response times.

Figure 9:
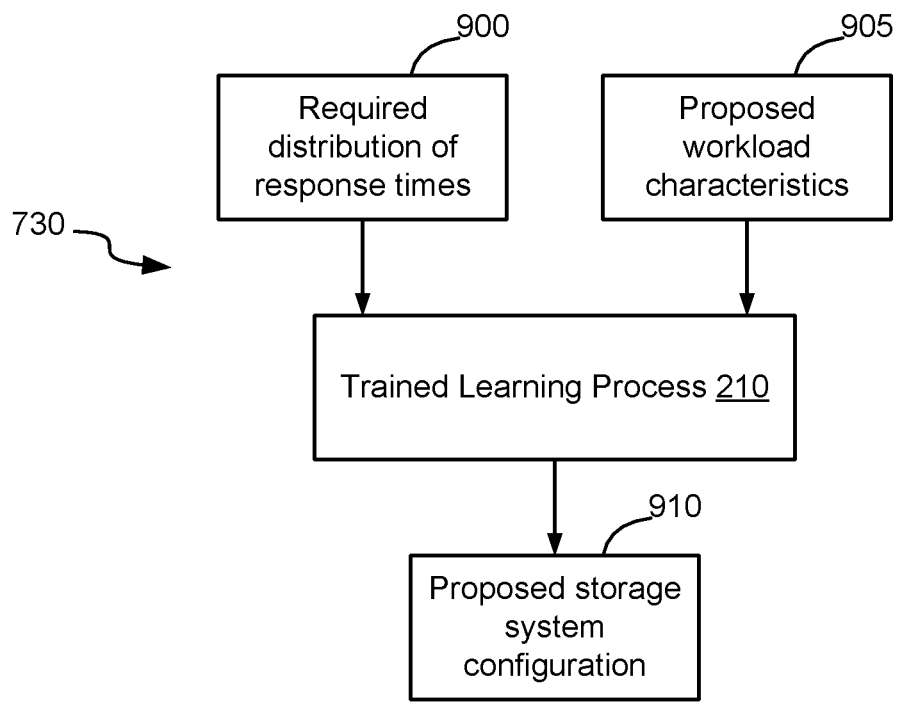
FIG. 9 is a flow chart of a method of using the trained learning process to provide proposed storage system configuration parameters based on estimated workload characteristics and a requested distribution of expected response times, according to some embodiments.

FIG. 9 shows another way of using the trained learning process 210. Specifically, as shown in FIG. 9, in some embodiments, a required distribution of response times (block 900) and proposed workload characteristics (block 905) are provided as input to the trained learning process 210. The required distribution of response times may be based, for example, on service level agreement (SLA) parameters specifying the distribution of acceptable response times that the storage system must achieve when processing read and write requests. The trained learning process 210 uses the input parameters and provides, as output, a proposed storage system configuration (block 910) that would be expected to be able to meet the required distribution of response times for the proposed workload characteristics. This enables a baseline storage system 100 configuration to be created, based on the characteristics of the workload that the storage system 100 is expected to handle, and the required distribution of response times of the applications that are associated with the proposed workload on the storage system 100.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible non-transitory computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for estimating a distribution of response times of a storage system for a proposed workload, the computer program including a set of instructions which, when executed by a computer, cause the computer to perform a method comprising the steps of:

obtaining a large number of collections of storage system response data from a plurality of storage systems during respective collection periods, each of the collections of storage system response data including: information describing physical hardware configuration parameters of a respective storage system that was used to create the collection and a plurality of workload snapshots obtained from the respective storage system, each workload snapshot including a number of read operations and a number of write operations on the storage system during a time interval within the respective collection period, and an average storage system response time of the storage system to the workload during the time interval;

for each collection, aggregating the number of read operations during the collection period and aggregating the number of write operations on the storage system from the plurality of workload snapshots obtained from the respective storage system during the collection period to create aggregated workload feature information for the collection;

for each collection, using the average storage system response times of the plurality of workload snapshots to learn mean and standard deviation coefficients describing two or more distributions of a probability mixture model characterizing storage system response times over the collection period for the collection, the probability mixture model being a probabilistic model describing the storage system response times based on a mixture of the two or more distributions;

creating a respective training example from each collection, each respective training example correlating storage system physical hardware configuration parameters and aggregated workload feature information with the mean and standard deviation coefficients describing the two or more distributions of the probability mixture model characterizing the storage system response times;

using the training examples to train a learning process to cause the learning process to learn a regression between storage system physical hardware configuration parameters and aggregated workload feature information with the mean and standard deviation coefficients describing the two or more distributions of the probability mixture model characterizing the storage system response times; and using the trained learning process to generate a distribution of expected storage system response times for a storage system having proposed physical hardware configuration parameters and a proposed workload.

2. The non-transitory tangible computer readable storage medium of claim 1, wherein each collection of storage system response data includes data obtained from a different storage system.

3. The non-transitory tangible computer readable storage medium of claim 1, wherein each collection of storage system response data includes data from a particular storage system, wherein each collection period is a several hour period of time, and wherein the time intervals of a given collection are several minute time windows of equal size.

4. The non-transitory tangible computer readable storage medium of claim 1, wherein each snapshot includes an aggregation of a number of operations of a set of additional workload features during the time interval.

5. The non-transitory tangible computer readable storage medium of claim 1, wherein using the average storage system response times of the plurality of workload snapshots to learn mean and standard deviation coefficients describing two or more distributions of a probability mixture model comprises iteratively using the average storage system response times from the set of snapshots of the collection to converge on the mean and standard deviation coefficients describing the two or more distributions of the probability mixture model for the collection.

6. The non-transitory tangible computer readable storage medium of claim 1, further comprising testing the learning function using a set of testing examples prior to using the trained learning process.

7. The non-transitory tangible computer readable storage medium of claim 1, wherein using the trained learning process comprises:

providing, as input to the trained learning process, the proposed storage system configuration and proposed workload; and comparing the distribution of expected storage system response times generated by the trained learning process to a required distribution of storage system response times.

8. The non-transitory tangible computer readable storage medium of claim 7, if the expected storage system response times generated by the trained learning process does not sufficiently correlate with the required distribution of expected storage system response times, the method further comprising:

automatically adjusting the proposed storage system configuration to create an adjusted storage system configuration;

providing, as input to the trained learning process, the adjusted storage system configuration and proposed workload;

generating, by the trained learning process, an adjusted distribution of expected storage system response times for the adjusted storage system configuration and proposed workload;

comparing the adjusted distribution of expected storage system response times generated by the trained learning process to the required distribution of expected storage system response times; and iterating the steps of automatically adjusting, providing, generating, and comparing until the adjusted storage system configuration sufficiently correlates with the required distribution of storage system response times.

9. A method of estimating a distribution of response times of a storage system for a proposed workload, the method comprising:

obtaining a large number of collections of storage system response data from a plurality of storage systems during respective collection periods, each of the collections of storage system response data including: information describing physical hardware configuration parameters of a respective storage system that was used to create the collection and a plurality of workload snapshots obtained from the respective storage system, each workload snapshot including a number of read operations and a number of write operations on the storage system during a time interval within the respective collection period, and an average storage system response time of the storage system to the workload during the time interval;

for each collection, aggregating the number of read operations during the collection period and aggregating the number of write operations on the storage system from the plurality of workload snapshots obtained from the respective storage system during the collection period to create aggregated workload feature information for the collection;

for each collection, using the average storage system response times of the plurality of workload snapshots to learn mean and standard deviation coefficients describing two or more distributions of a probability mixture model characterizing storage system response times over the collection period for the collection, the probability mixture model being a probabilistic model describing the storage system response times based on a mixture of the two or more distributions;

creating a respective training example from each collection, each respective training example correlating storage system physical hardware configuration parameters and aggregated workload feature information with the mean and standard deviation coefficients describing a the two or more distributions of the probability mixture model characterizing the storage system response times;

using the training examples to train a learning process to cause the learning process to learn a regression between storage system physical hardware configuration parameters and aggregated workload feature information with the mean and standard deviation coefficients describing the two or more distributions of the probability mixture model characterizing the storage system response times; and using the trained learning process to generate a distribution of expected storage system response times for a storage system having proposed physical hardware configuration parameters and a proposed workload.

10. The method of claim 9, wherein each collection of storage system response data includes data obtained from a different storage system.

11. The method of claim 9, wherein each collection of storage system response data includes data from a particular storage system, wherein each collection period is a several hour period of time, and wherein the time intervals of a given collection are time windows of equal size.

12. The method of claim 9, wherein each snapshot includes an aggregation of a number of operations of a set of additional workload features during the time interval.

13. The method of claim 9, wherein using the average storage system response times of the plurality of workload snapshots to learn mean and standard deviation coefficients describing two or more distributions of a probability mixture model comprises iteratively using the average storage system response times from the set of snapshots of the collection to converge on the mean and standard deviation coefficients describing the two or more distributions of the probability mixture model for the collection.

14. The method of claim 9, further comprising testing the learning function using a set of testing examples prior to using the trained learning process.

15. The method of claim 9, wherein using the trained learning process comprises:

providing, as input to the trained learning process, the proposed storage system configuration and proposed workload; and comparing the distribution of expected storage system response times generated by the trained learning process to a required distribution of storage system response times.

16. The method of claim 15, if the expected storage system response times generated by the trained learning process does not sufficiently correlate with the required distribution of expected storage response times, the method further comprising:

automatically adjusting the proposed storage system configuration to create an adjusted storage system configuration;

providing, as input to the trained learning process, the adjusted storage system configuration and proposed workload;

generating, by the trained learning process, an adjusted distribution of expected storage system response times for the adjusted storage system configuration and proposed workload;

comparing the adjusted distribution of expected storage system response times generated by the trained learning process to the required distribution of expected storage system response times; and iterating the steps of automatically adjusting, providing, generating, and comparing until the adjusted storage system configuration sufficiently correlates with the required distribution of storage system response times.

* * * * *